Nov. 13, 1956     O. R. BRENNER ET AL     2,770,401

MEASURING DISPENSER CLOSURE

Filed Dec. 7, 1954

INVENTORS.
ORLESTUS R. BRENNER.
& WILLIAM BROSS.
BY
ATTORNEY.

United States Patent Office 2,770,401
Patented Nov. 13, 1956

2,770,401

MEASURING DISPENSER CLOSURE

Orlestus R. Brenner and William Bross, Cincinnati, Ohio

Application December 7, 1954, Serial No. 473,544

4 Claims. (Cl. 222—339)

This invention relates to a dispenser having a measuring device in the cap primarily useful for dispensing powdered coffee, although various other granular products may be dispensed therefrom.

The device is intended to be attached to a jar or other container of the product after removing the normal closure.

The object of our invention is to provide a closure device with a movable member normally maintained in closed position and provided with a measuring compartment movable from a filling position to a discharge position.

A further object is to provide means for maintaining the movable member in position on the closure and to retract the member to closed position upon release of the device.

Our invention will be further readily understood from the following description and claims, and from the drawings, in which latter:

Figure 1:
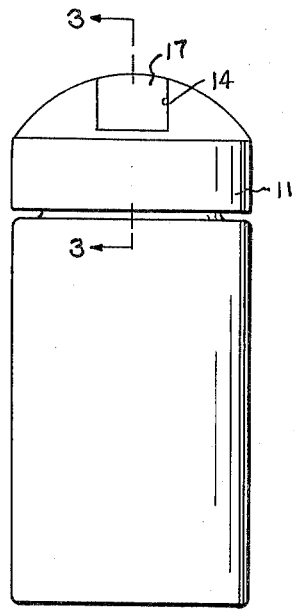
Fig. 1 is a front view of the device attached to a jar.
Figure 2:
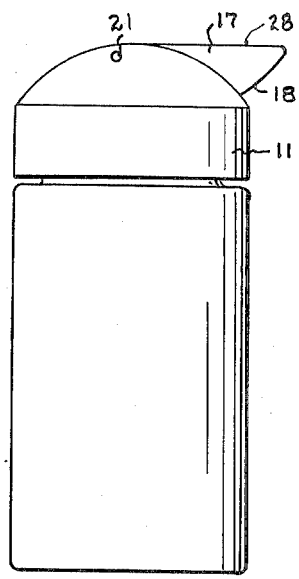
Fig. 2 is a side view of the device attached to a jar.

Powdered coffee or other granular products sold in screw cap jars are usually dispensed with a spoon. Our improved closure is designed to be attached to the jar or container in place of the usual screw cap and forms a closure and measuring dispenser.

Our improved closure comprises a housing 11 having an internally threaded portion 12 terminating in a shoulder 13. A slot 14 extends laterally across the housing having an arcuate face 15. An opening 16 connects the slot 14 to the threaded portion 12.

A member 17 having a lower arcuate face 18 is received in the slot 14 and extends on one end beyond the housing 11. A cavity 19 in the member 17 normally connects with the opening 16 and forms a measuring cavity. A spring 20 is attached to a cross-pin 21 in the member 17 and extends through a cavity 22 in the member 17 and an aperture 23 in the housing. The other end of the spring is attached to a bar-pin 24 received in a groove 25. A gasket 26 is cemented to the shoulder 13 having an aperture 27 registering with the opening 16.

Figure 3:
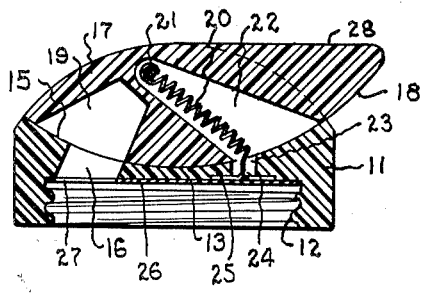
Fig. 3 is an enlarged section of the closure, taken in the plane of the line 3—3 of Fig. 1.

The spring 20 returns the member 17 to normal position as shown in Fig. 3 and also acts as a stop for the member and holds the member in the slot.

Figure 4:
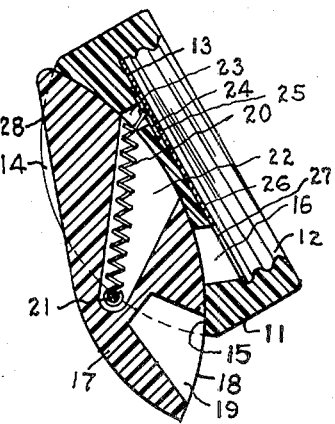
Fig. 4 is a section view of the device in dispensing position.

The device is attached to a container by means of the screw threaded housing. When it is desired to dispense a measured amount of the product, the container is tilted to allow the cavity 19 to fill and pressure is applied to the face 28 of the movable member to move the member to the position shown in Fig. 4, to dispense the measured amount of the product into a suitable container. Release of pressure on the face 28, the member 17 under the urging of the spring 20 will return to normal position.

Having thus fully described our invention, what we claim as new and desire to secure by Letters Patent, is:

1. A closure cap comprising a housing having a neck attachable to a container, an arcuate slot in said housing above said neck, said housing provided with a passage connecting said arcuate slot with said neck, a sliding member movable endwise in said arcuate slot, and a measuring cavity in said member co-operating with said passage.

2. A closure cap comprising a housing having a neck attachable to a container, an arcuate slot in said housing above said neck, said housing provided with a passage connecting said arcuate slot with said neck, a sliding member movable endwise in said arcuate slot, a measuring cavity in said member co-operating with said passage, and yieldable means for holding said arcuate member in said slot and in closed position.

3. A closure cap comprising a housing having a neck attachable to a container, an arcuate slot in the upper face of said housing above said neck, said housing provided with a passage connecting said arcuate slot with said neck, a sliding member positioned in said arcuate slot, a spring attached to said member and the neck of said closure for holding said member in said slot and urging said member in an endwise movement in one direction, and a measuring cavity in said member normally registering with said passage.

4. A closure cap comprising a housing having a neck attachable to a container, an arcuate slot in the upper face of said housing above said neck, said housing provided with a passage connecting said arcuate slot with said neck, a sliding member positioned in said arcuate slot, a spring attached to said member and the neck of said closure for holding said member in said slot and urging said member in an endwise movement in one direction, a measuring cavity in said member normally registering with said passage, and said spring limiting the movement of said movable member.

References Cited in the file of this patent

UNITED STATES PATENTS

| | | |
|---|---|---|
| 1,277,406 | Gibbons | Sept. 3, 1918 |
| 1,710,233 | Mason et al. | Apr. 23, 1929 |
| 1,800,936 | Ganger | Apr. 14, 1931 |
| 2,657,837 | Bernhardt | Nov. 3, 1953 |